United States Patent
Sawada et al.

(10) Patent No.: US 11,123,832 B2
(45) Date of Patent: *Sep. 21, 2021

(54) WORKPIECE HOLDING DEVICE AND LOADING APPARATUS THAT USES THE WORKPIECE HOLDING DEVICE

(71) Applicant: NAKAMURA-TOME PRECISION INDUSTRY CO., LTD., Ishikawa (JP)

(72) Inventors: Manabu Sawada, Kanazawa (JP); Naotsugu Nishimura, Hakusan (JP)

(73) Assignee: NAKAMURA-TOME PRECISION INDUSTRY CO., LTD., Hakusan (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/601,664

(22) Filed: Oct. 15, 2019

(65) Prior Publication Data

US 2020/0122285 A1    Apr. 23, 2020

(30) Foreign Application Priority Data

Oct. 18, 2018  (JP) .................................. 2018-196258
Oct. 18, 2018  (JP) .............................. JP2018-196259

(51) Int. Cl.
  *B23B 31/177*  (2006.01)
  *B23Q 17/20*   (2006.01)
  (Continued)

(52) U.S. Cl.
  CPC ........ *B23Q 17/20* (2013.01); *B23B 31/16258* (2013.01); *B23Q 17/003* (2013.01);
  (Continued)

(58) Field of Classification Search
  CPC .................. B23Q 17/20; B23Q 17/003; B23Q 2039/008; B23Q 2701/01;
  (Continued)

(56) References Cited

U.S. PATENT DOCUMENTS 3,936,060 A * 2/1976 Hirao ...................... B23B 31/26
                                                         279/126
4,443,021 A * 4/1984 Buchholz ................. B23Q 3/16
                                                         279/4.02
(Continued)

FOREIGN PATENT DOCUMENTS

EP    0556049 A2    8/1993
EP    3199297 A1    8/2017
(Continued)

OTHER PUBLICATIONS

U.S. Appl. No. 16/601,645, filed Oct. 15, 2019 in the name of Manabu Sawada et al.
(Continued)

*Primary Examiner* — Eric A. Gates
*Assistant Examiner* — Chwen-Wei Su
(74) *Attorney, Agent, or Firm* — Oliff PLC

(57) ABSTRACT

A workpiece holding device includes: a chuck including a chuck body, and a plurality of chuck claws openably supported on the chuck body and configured to hold a workpiece; an operation rod configured to drive the plurality of chuck claws for opening and closing with movement of the operation rod; and a measuring apparatus configured to measure an opening dimension of the plurality of chuck claws based on a movement amount of the operation rod.

4 Claims, 4 Drawing Sheets

(51) Int. Cl.
    *B23Q 17/00*     (2006.01)
    *G05B 19/401*     (2006.01)

(52) U.S. Cl.
    CPC ........ *G05B 19/401* (2013.01); *B23B 2231/10* (2013.01); *B23B 2231/26* (2013.01); *B23B 2260/128* (2013.01); *G05B 2219/37207* (2013.01); *G05B 2219/37236* (2013.01); *Y10T 279/1906* (2015.01); *Y10T 279/1973* (2015.01); *Y10T 279/21* (2015.01)

(58) Field of Classification Search
    CPC ........ B23Q 2707/003; B23B 31/16266; B23B 31/16258; B23B 31/1622; B23B 31/16229; B23B 2231/10; B23B 2231/26; B23B 2260/128; G05B 19/401; G05B 2219/37207; G05B 2219/37236; Y10T 279/1906; Y10T 279/1973; Y10T 279/21
    USPC .......................................... 82/124, 132, 137
    See application file for complete search history.

(56) References Cited

U.S. PATENT DOCUMENTS

| | | | | |
|---|---|---|---|---|
| 6,079,303 | A * | 6/2000 | Lyachovitsky | B23B 31/28 279/114 |
| 6,478,310 | B1 * | 11/2002 | Azami | B23B 31/1622 279/4.02 |
| 8,991,288 | B2 * | 3/2015 | Watanabe | B23Q 7/04 82/124 |
| 9,731,394 | B2 * | 8/2017 | Yoshimura | G05B 19/404 |
| 10,130,999 | B2 | 11/2018 | Miyamoto et al. | |
| 10,393,496 | B2 * | 8/2019 | Chen | B25B 5/16 |
| 2017/0209939 | A1 * | 7/2017 | Miyamoto | B23B 31/30 |
| 2017/0282322 | A1 * | 10/2017 | Mori | B23Q 7/04 |
| 2019/0369596 | A1 * | 12/2019 | Kamiguchi | G05B 19/401 |
| 2019/0384253 | A1 * | 12/2019 | Ozeki | G06N 20/00 |

FOREIGN PATENT DOCUMENTS

| | | |
|---|---|---|
| JP | 2000-343474 A | 12/2000 |
| JP | 2017-131982 A | 8/2017 |

OTHER PUBLICATIONS

Mar. 26, 2020 Search Report issued in European Patent Application No. 19203331.4.
Sep. 29, 2020 Office Action issued in U.S. Appl. No. 16/601,645.
Mar. 25, 2021 Office Action issued in U.S. Appl. No. 16/601,645.

* cited by examiner

WORKPIECE HOLDING DEVICE AND LOADING APPARATUS THAT USES THE WORKPIECE HOLDING DEVICE

This application is based upon and claims the benefit of priority to Japanese Patent Application No. 2018-196258, filed on Oct. 18, 2018, and Japanese Patent Application No. 2018-196259, filed on Oct. 18, 2018, the entire contents of which are incorporated herein by reference.

BACKGROUND

The present disclosure relates to a loading apparatus that performs automatic loading, automatic unloading or the like of a workpiece to and from a machine tool, or relates to a workpiece holding device that is used for the hand portion, the manipulator or the like of a robot.

A holding device for transferring a workpiece is attached to the loader of a loading apparatus, the hand portion of an industrial robot or the like used in the field of machine tool or the like.

For example, JP-A-2000-343474 discloses an opening/closing chuck formed of a pair of holding portions that performs an opening/closing motion with the driving of a cylinder mechanism.

However, the object of a workpiece holding device disclosed in JP-A-2000-343474 is to increase the opening/closing stroke of the holding portions so that the workpiece holding device cannot measure the size or the like of the workpiece, and cannot perform self-diagnosis of failure.

DESCRIPTION OF EXEMPLARY EMBODIMENTS

Figure 1:
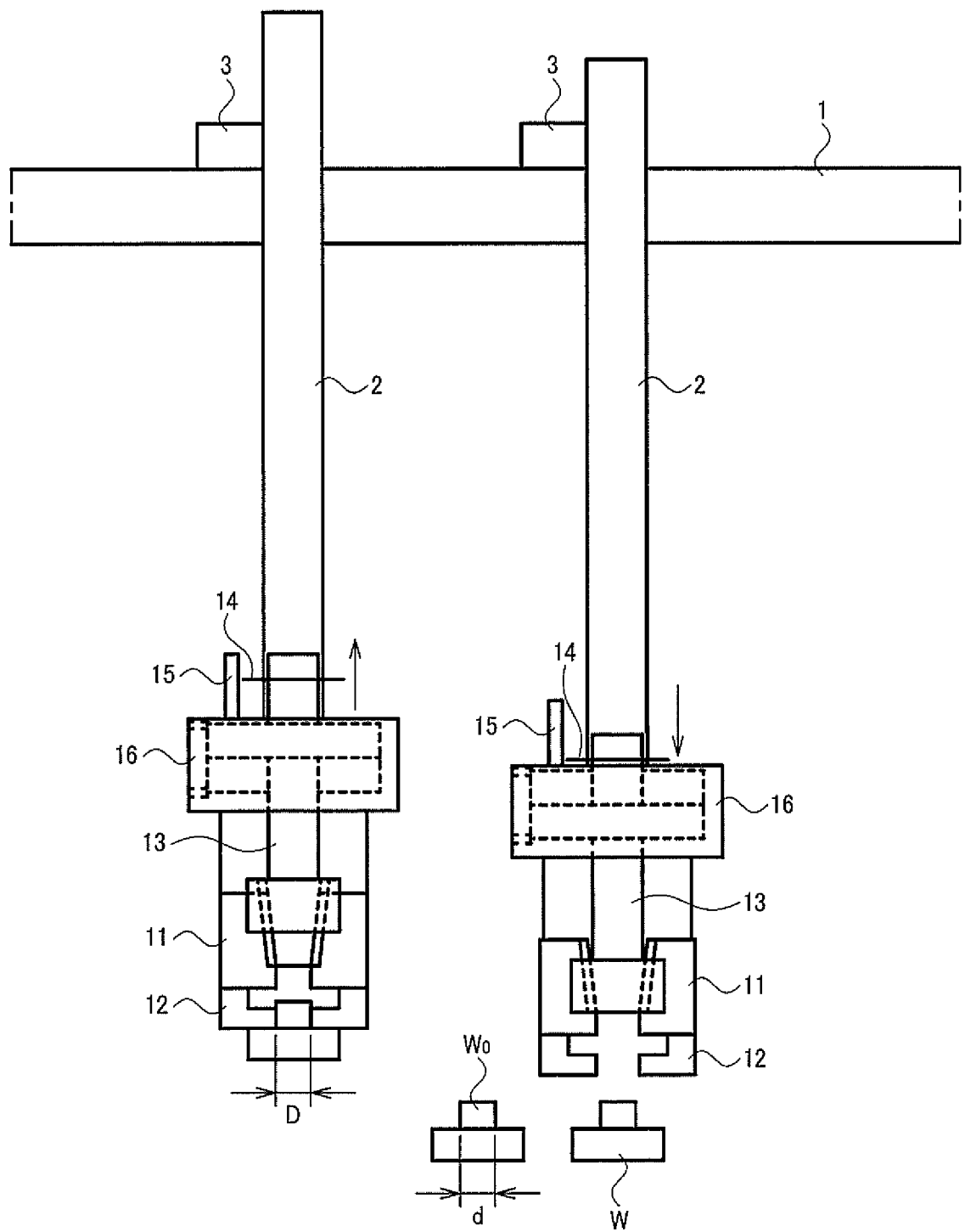
FIG. 1 illustrates an example where a workpiece holding device according to the embodiment is applied to a loader of a loading apparatus.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

It is an object of the disclosure to provide a workpiece holding device where the dimension of a workpiece can be measured simultaneously with the workpiece holding motion, and to provide a loading apparatus that uses the workpiece holding device.

In accordance with one of some embodiments, there is provided a workpiece holding device comprising:
a chuck including a chuck body, and a plurality of chuck claws openably supported on the chuck body and configured to hold a workpiece;
an operation rod configured to drive the plurality of chuck claws for opening and closing with movement of the operation rod; and
a measuring apparatus configured to measure an opening dimension of the plurality of chuck claws based on a movement amount of the operation rod.

In this specification, a chuck including a plurality of chuck claws that is used in the embodiment may be a chuck including two to four chuck claws concentrically, a so-called collet chuck or the like. That is, provided that the opening dimension of the plurality of chuck claws is increased and reduced in an interlocking manner with the movement of the operation rod, the structure of the chuck is not limited.

For the chuck mounted on the workpiece holding device, a slide cam mechanism or a rotating cam mechanism may be mentioned, for example. The slide cam mechanism is a mechanism where a plurality of chuck claws are opened and closed in a sliding manner along a plurality of movement guide members inclined with respect to the rotation center axis of the chuck body and including grooves having a T shape in cross section. The rotating cam mechanism is a mechanism where the plurality of chuck claws are driven for opening and closing with the rotation of a cam.

The plurality of chuck claws may hold the outer peripheral portion of the workpiece, or may hold the inner side of the workpiece.

A measuring apparatus used in the embodiment is an apparatus that can detect increasing and reducing of an opening dimension formed by the plurality of chuck claws from variation in the movement amount of the operation rod. The mechanism of the measuring apparatus is not limited.

The holding device according to the embodiment can be used as the loader of the loading apparatus that performs loading and unloading of a workpiece to and from a machine tool, and can also be used in a state where the holding device is attached to the hand portion of an industrial robot or the like.

In the workpiece holding device according to the embodiment, the dimension of the holding portion of the workpiece can be measured simultaneously with the holding of the outer peripheral portion or the inner peripheral portion of the workpiece by the plurality of chuck claws. With such a configuration, it is possible to confirm whether or not the workpiece matches with a workpiece registered in advance.

Further, with the measurement of the opening dimension of the plurality of chuck claws, (1) whether or not the workpiece is accurately held by the plurality of chuck claws can be confirmed so that (2) it is possible to detect malfunctions of the chuck or the like that includes the plurality of chuck claws.

Further, the processed portion is set such that the processed portion is held at the time of unloading the workpiece on which mechanical processing is performed. Accordingly, (3) whether or not a processing dimension is correct can be automatically checked.

In accordance with one of some embodiments, there is provided the workpiece holding device, wherein the measuring apparatus may include a sensor that detects the movement amount of the operation rod, and a calculation unit that converts the movement amount of the operation rod into the opening dimension of the plurality of chuck claws.

A sensor that detects the movement amount of the operation rod may be of a contact type or a non-contact type.

For the sensor of a non-contact type, a sensor that detects variation in inductance of a coil disposed in parallel to the moving direction of a detecting dog provided to the operation rod, a sensor that optically detects the movement amount of the dog and the like may be mentioned as examples.

In accordance with one of some embodiments, there is provided the workpiece holding device, wherein the measuring apparatus may include a correction unit that causes a detection value detected by the sensor to be linearly approximated to make a correction.

With such a configuration, even if the detection of the sensor has a fluctuation, it is possible to make a correction to a more accurate value.

In accordance with one of some embodiments, there is provided the workpiece holding device may further comprise:

a storage unit configured to store a plurality of dimensions relating to the holding portion in association with plural kinds of workpieces to be processed; and a comparison unit configured to compare the opening dimension of one of the plural kinds of workpieces measured by the measuring apparatus and a corresponding dimension of the plurality of dimensions stored in the storage unit.

With such a configuration, confirming and detection (1) to (3) described above can be performed on plural kinds of workpieces. Further, the workpiece holding device may also be effectively used as an automatic diagnosis system that automatically diagnoses whether or not there is abnormality in a check or chuck claws.

In accordance with one of some embodiments, the workpiece holding device may further comprise:

a storage unit configured to store a dimension relating to the holding portion that is common to a plurality of workpieces to be processed, a time series storage unit configured to record, in time series, a plurality of opening dimensions of the plurality of workpieces measured by the measuring unit; and an analysis unit configured to analyze time-series variation in dimension by comparing the plurality of opening dimensions stored in the time series storage unit and the dimension relating to the holding portion stored in the storage unit.

A measurement target may contain, in addition to variation in the dimension of the workpiece, data relating to the operation of the chuck, such as variation in opening/closing speed of the chuck or variation in opening/closing time of the chuck. Accordingly, a timer means or the like may be added.

Based on the analysis of variation in the dimension of the workpiece or the variation amount of additional data, NC command coordinates may be corrected or transferred, or a processing program may be modified. Alternatively, the analysis may be applicable to finding or predicting abnormality in the spindle, the chuck, tools or the like at an early stage.

Further, these variations in measured value can be analyzed in time series and hence, these variations may also be utilized for modifying a transferring or a processing program or for correcting coordinates of a tool, coordinates of a processing point or the like.

The disclosure also relates to a loading apparatus provided with the above-mentioned workpiece holding device. In this case, a control unit provided to the loading apparatus or to a machine tool or the like that controls the loading apparatus may include a storage unit that stores, in advance, information of a workpiece, such as the kinds of the workpiece to be transferred, or a holding dimension of a holding portion of the workpiece.

FIG. 1 illustrates an example where a workpiece holding device is applied to a loader of a loading apparatus that is NC controlled by an NC control unit of a machine tool.

Figure 2:
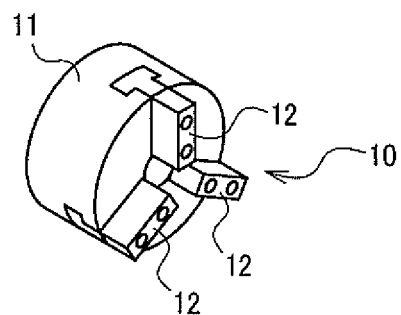
FIG. 2 is a perspective view of a chuck illustrated in FIG. 1.
Figure 3:
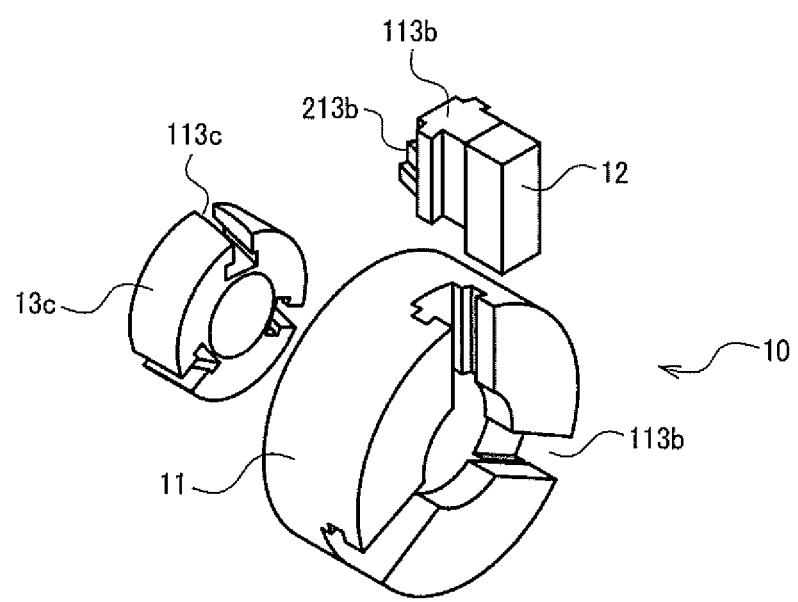
FIG. 3 is an exploded perspective view of the chuck of a turning cam type illustrated in FIG. 2.

The workpiece holding device includes a chuck 10 and an operation rod 13. As illustrated in FIG. 1 to FIG. 3, the chuck 10 includes a chuck body 11, and a plurality of, for example, three chuck claws 12 openably supported on the chuck body 11. In this embodiment, three slide groove portions 113a having a substantially T shape in cross section are formed on the chuck body 11 radially from the center portion of the chuck body 11, and the three chuck claws 12 are mounted in these slide groove portions 113a.

As illustrated in FIG. 3, the chuck body 11 includes, on the center side of the rear surface, a slide cam 13c connected to the distal end side of the operation rod 13. The slide cam 13c includes operation groove portions 113c that correspond to the three chuck claws 12.

Each chuck claw 12 includes a sliding portion 113b that is, along the slide groove portion 113a formed in the chuck body 11, slidably movable inward and outward in the radial direction toward the axis of the operation rod 13. The chuck claw 12 includes an action portion 213b that is mounted in the operation groove portion 113c formed on the slide cam 13c, and moves according to the forward movement or backward movement of the slide cam 13c.

The plurality of chuck claws 12 may be outer chuck claws, inner chuck claws or the like depending on whether the chuck claws 12 hold the outer peripheral portion or the inner peripheral portion of a workpiece. However, the dimension of an opening portion for holding a workpiece by the plurality of chuck claws 12 is expressed as an opening dimension D.

The forward and backward movement of the operation rod 13 in the axial direction of the operation rod 13 causes the plurality of chuck claws 12 to be opened and closed. As illustrated on the left side in FIG. 1, with the movement of the operation rod 13 toward one side in the axial direction of the operation rod 13 (for example, backward movement), the plurality of chuck claws 12 are closed so that the opening dimension D of the chuck claws 12 is reduced. With such reduction, the chuck 10 can hold a workpiece. As illustrated on the right side in FIG. 1, with the movement of the operation rod 13 toward the other side in the axial direction of the operation rod 13 (for example, forward movement), the slide cam 13c moves forward so that the plurality of chuck claws 12 are opened, thus increasing the opening dimension D of the chuck claws 12. With such an increase, the workpiece can be removed from the chuck 10.

The operation rod 13 is configured such that the movement amount of the operation rod 13 is controlled by controlling a cylinder portion 16 formed of an air cylinder, a hydraulic cylinder or the like.

A dog 14 is attached to the operation rod 13, and the position of the dog 14 can be detected by a sensor portion 15 formed of an electromagnetic stroke sensor or the like.

Provided that the movement amount of the operation rod 13 can be detected, the sensor portion 15 is not limited to the electromagnetic stroke sensor.

The loading apparatus of this embodiment includes arms 2 that move along a traveling rail 1. Although two arms 2 are provided to one traveling rail 1 in FIG. 1, only one arm 2 may be provided to the traveling rail 1. The arms 2 are moved upward or downward with respect to the traveling rail 1 by drive units 3. The above-mentioned workpiece holding device is attached to the end portion of each arm 2.

Figure 4:
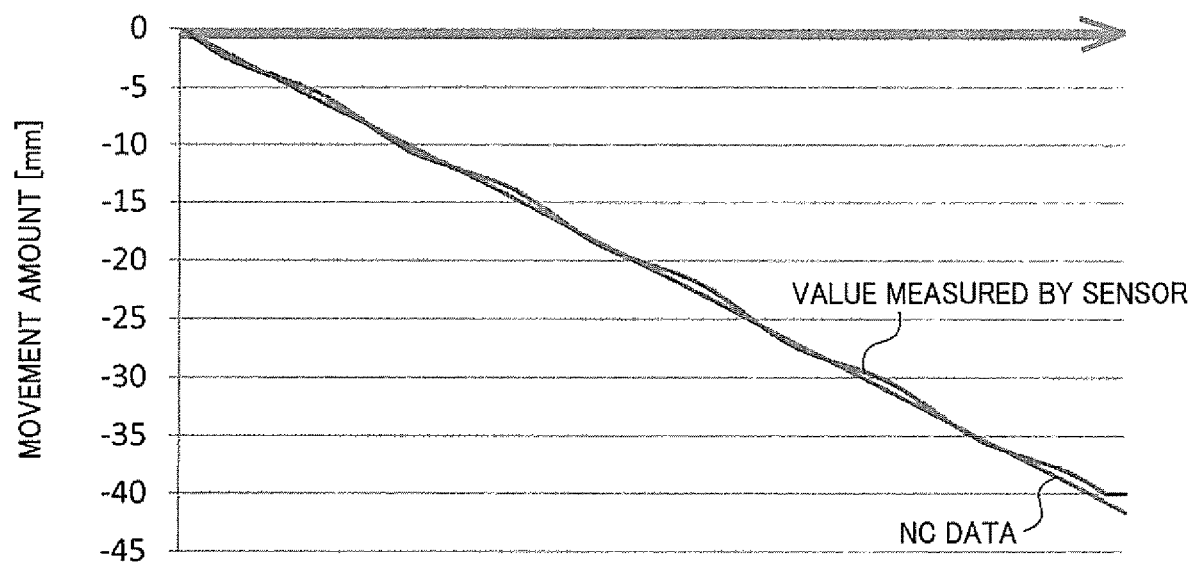
FIG. 4 illustrates the relationship between a movement amount of the operation rod and the opening dimension of holding chuck claws.

FIG. 4 illustrates the results of the investigation on a value of the movement amount of the dog 14 detected by the stroke sensor 15 and an opening dimension actually formed by the three chuck claws 12. In FIG. 4, the movement amount of the dog 14 is taken on an axis of ordinates, and variation in opening dimension is taken on an axis of abscissas. In FIG. 4, values measured by the stroke sensor 15 and data in an NC device installed on the machine tool are respectively illustrated.

Although wave-shaped variation is slightly seen in the movement amount detected by the stroke sensor 15 from FIG. 4, it can be confirmed from FIG. 4 that the movement amount is proportional to opening amount of an opening dimension D of the plurality of chuck claws 12. Accordingly, it can be understood that the opening dimension of the chuck 10 can be obtained by detecting the movement amount of the dog 14.

Figure 5:
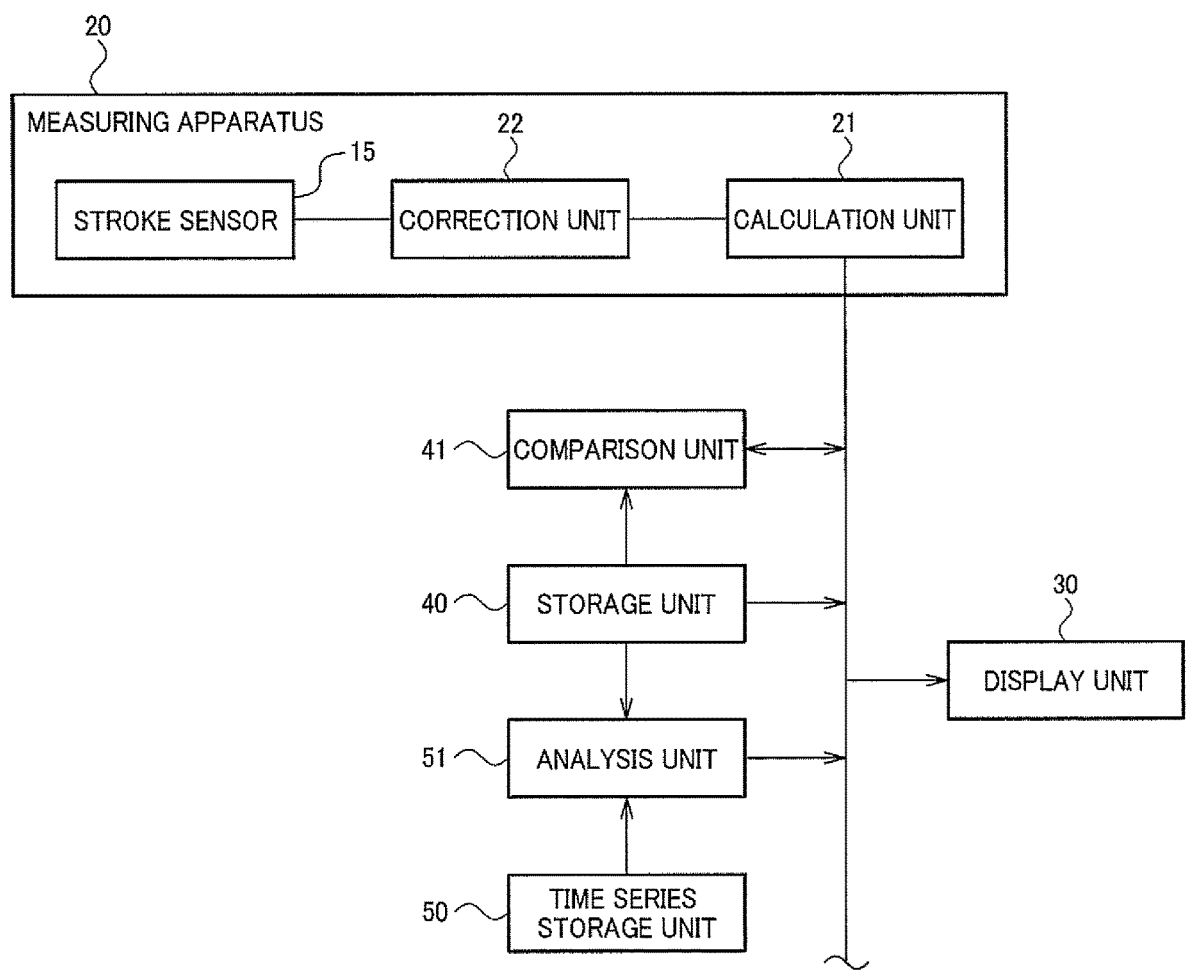
FIG. 5 is a control block diagram of the workpiece holding device.

Therefore, in this embodiment, as illustrated in FIG. 5, the workpiece holding device may include a measuring apparatus 20 that measures the opening dimension of the plurality of chuck claws 12 based on the movement amount of the operation rod 13. The measuring apparatus 20 includes the stroke sensor 15 and a calculation unit 21 that converts the movement amount of the operation rod 13 detected by the stroke sensor 15 into the opening dimension of the chuck 10.

The measuring apparatus 20 may include a correction unit 22 that causes a detection value detected by the stroke sensor 15 to be linearly approximated to make a correction by a method of least squares or the like, for example.

In the loading apparatus according to this embodiment, when the operation rod 13 is moved backward due to a hydraulic pressure operation of the chuck cylinder 16, a workpiece W is held by the three chuck claws 12. At this point of operation, the opening dimension D is equal to the outer diameter dimension of the holding portion of the workpiece W. The opening dimension D of the plurality of chuck claws 12 corresponds to the movement amount of the operation rod 13. Accordingly, the outer diameter dimension of the holding portion of the workpiece W is measured by detecting the movement amount of the operation rod 13.

As illustrated in FIG. 5, a measured value obtained by the calculation unit 21 may be displayed on a display unit 30 provided to an operation unit, such as an operation panel of the machine tool.

Further, as illustrated in FIG. 5, the workpiece holding device, the loading apparatus or the machine tool may include a storage unit 40 that stores a plurality of dimensions relating to the holding portion of a workpiece in association with plural kinds of workpieces to be transferred. In this case, a comparison unit 41 is further provided that compares the opening dimension of one of the plural kinds of workpieces measured by the measuring apparatus 20 and a corresponding dimension of a plurality of dimensions stored in the storage unit 40.

When the chuck 10 holds the workpiece W, the dimension of the holding portion of the workpiece is outputted from the storage unit 40 and is displayed on the display unit 30. The comparison unit 41 compares the opening dimension measured by the measuring apparatus 20 and the dimension of the holding portion of the workpiece W stored in the storage unit 40 and displayed on the display unit 30. When the comparison results are matched, such a match is displayed on the display unit 30.

In contrast, there may be a case where a workpiece is not correctly seated, or a foreign substance or the like is present between the workpiece and the chuck claws 12. In this case, a difference is generated between a movement amount of the dog 14 of the operation rod 13 and a value registered in the storage unit 40 in advance, that is, the outer diameter of the holding portion of the workpiece.

When such a situation occurs, a mismatch is determined by the comparison unit 41 and hence, failure can be detected. Such a mismatch is displayed on the display unit 30 so as to give a warning.

A similar situation may occur also due to breakage or the like of the chuck, the holding chuck claw or other members. Accordingly, the embodiment may also be effectively used as a fault diagnosis system for the loading apparatus.

Further, the storage unit 40 illustrated in FIG. 5 can store a dimension relating to a holding portion that is common to a plurality of workpieces to be transferred. In this case, the workpiece holding device, the loading apparatus or the machine tool may further include a time series storage unit 50 and an analysis unit 51. The time series storage unit 50 records, in time series, a plurality of opening dimensions of the plurality of workpieces measured by the measuring apparatus 20. The analysis unit 51 compares each of the plurality of opening dimensions stored in the time series storage unit 50 and the common dimension stored in the storage unit 40 so as to analyze time-series variation in dimension.

Based on the results of an analysis performed by the analysis unit 51, an operator may modify a transferring or a processing program, or correct or modify NC command coordinates when necessary.

A measurement target may contain, in addition to variation in the dimension of the workpiece, data relating to the operation of the chuck, such as variation in opening/closing speed of the chuck or variation in opening/closing time of the chuck. Accordingly, a timer means or the like may be added.

Based on the analysis of variation in the dimension of the workpiece or the variation amount of additional data, NC command coordinates may be corrected or transferred, or a processing program may be modified. Alternatively, the analysis may be applicable to finding or predicting abnormality in the spindle, the chuck, tools or the like at an early stage. Further, these variations in measured value can be analyzed in time series and hence, these variations may also be utilized for modifying a transferring or a processing program or for correcting coordinates of a tool, coordinates of a processing point or the like.

The loading apparatus may unload a workpiece in a state of holding a portion processed by the machine tool. By comparing a value measured at this point of operation with a value registered in the storage unit 40 in advance, the comparison unit 41 can automatically judge the quality of the processing.

As described above, according to this embodiment, the dimension of a workpiece can be automatically measured within a transferring step and hence, it is possible to eliminate the measurement performed outside the line.

In the embodiment, the mechanism of the chuck is not limited. The chuck may be configured such that the holding chuck claws 12 are opened/closed due to turning of a turning cam connected to the operation rod 13.

What is claimed is:

1. A loading apparatus comprising:
a traveling rail;
an arm that is configured to move with respect to the traveling rail; and
a workpiece holding device provided at an end portion of the arm,
wherein the workpiece holding device includes:
a chuck including a chuck body, and a plurality of chuck claws openably supported on the chuck body and configured to hold a holding portion of a workpiece;
an operation rod configured to drive the plurality of chuck claws for opening and closing with movement of the operation rod; and
a measuring apparatus configured to measure an opening dimension of the plurality of chuck claws based on a movement amount of the operation rod,
wherein the measuring apparatus includes:
a sensor configured to detect the movement amount of the operation rod,
a calculation unit configured to convert the movement amount of the operation rod into the opening dimension of the plurality of chuck claws, and
a correction unit configured to cause a detection value detected by the sensor to be linearly approximated to make a correction.

2. The loading apparatus according to claim 1, further comprising:
a storage unit configured to store a plurality of dimensions relating to the holding portion in association with plural kinds of workpieces to be processed; and
a comparison unit configured to compare an opening dimension of one of the plural kinds of workpieces measured by the measuring apparatus and a corresponding dimension of the plurality of dimensions stored in the storage unit.

3. The loading apparatus according to claim 1, further comprising:
a storage unit configured to store a dimension relating to the holding portion that is common to a plurality of workpieces to be processed,
a time series storage unit configured to record, in time series, a plurality of opening dimensions of the plurality of workpieces measured by the measuring unit; and
an analysis unit configured to analyze time-series variation in dimension by comparing the plurality of opening dimensions stored in the time series storage unit and the dimension relating to the holding portion stored in the storage unit.

4. The loading apparatus according to claim 1, wherein,
the loading apparatus is configured to unload the workpiece in a state of holding the holding portion of the workpiece from a machine tool which has processed the holding portion of the workpiece, and
the loading apparatus further comprises:
a storage unit configured to store a process dimension of the workpiece; and
a comparison unit configured to compare an opening dimension measured by the measuring apparatus while unloading and the process dimension stored in the storage unit.

* * * * *